A. H. GARRISON.
TIRE STRUCTURE.
APPLICATION FILED APR. 14, 1915.
1,145,580.
Patented July 6, 1915.
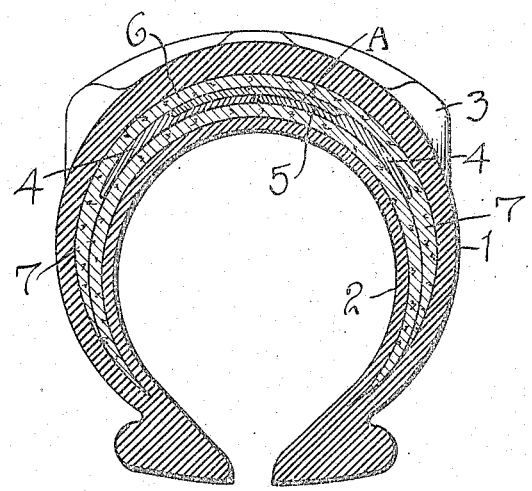
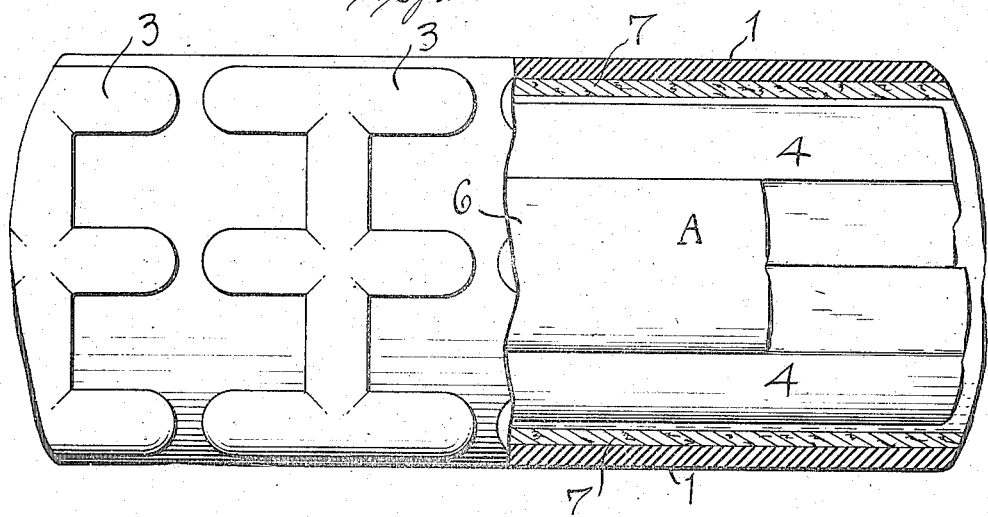
Inventor
A. H. GARRISON
By Watson E. Coleman
Attorney

UNITED STATES PATENT OFFICE.

ALMOND H. GARRISON, OF DAVISBURG, MICHIGAN.

TIRE STRUCTURE.

1,145,580.  Specification of Letters Patent.  Patented July 6, 1915.

Application filed April 14, 1915. Serial No. 21,385.

*To all whom it may concern:*

Be it known that I, ALMOND H. GARRISON, a citizen of the United States, residing at Davisburg, in the county of Oakland and State of Michigan, have invented certain new and useful Improvements in Tire Structures, of which the following is a specification, reference being had to the accompanying drawings.

This invention relates to certain improvements in tire structures, and it is an object of my invention to provide in a structure of this general character novel and improved means whereby the life of the structure is materially prolonged and the possibility of the same becoming punctured is reduced to a minimum.

The invention consists in the details of construction and in the combination and arrangement of the several parts of my improved tire structure whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a transverse sectional view taken through a tire constructed in accordance with an embodiment of my invention; and Fig. 2 is a fragmentary view, partly in top plan and partly in section, of my improved device as herein embodied.

As herein embodied, my improved tire structure comprises the outer lamination 1 and the inner lamination 2 of rubber, the tread portion of the lamination 1 being provided with the anti-slipping lugs 3 of such formation as to prevent lateral slip. Interposed between the laminations 1 and 2 and at the tread portion of the tire is the armor A, herein set forth as comprising the annular metallic members 4 disposed side by side and of requisite curvature in cross section and having their adjacent marginal portions reduced in thickness, as indicated at 5, to afford an annular groove or channel in which is positioned the intermediate annular member 6. The members 4 and 6 are preferably produced of steel and in order to protect the laminations 1 and 2 against the action of said members 4 and 6, I have the same positioned between the cork laminations 7, said cork also serving to cheapen the cost of production and to lighten the tire.

It is thought to be self-evident that upon the various parts of my improved structure being assembled, the same is vulcanized in the usual way.

From the foregoing description, it is thought to be obvious that a tire structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A tire structure including an internal armor comprising annular metallic members disposed side by side, an additional annular metallic member overlying the first mentioned annular members and contacting therewith, and cork laminations incasing said metallic annular members.

2. A tire structure including an internal armor comprising annular metallic members disposed side by side and having their adjacent marginal portions reduced in thickness to afford a channel, an annular metallic member positioned within said channel, and cork laminations incasing said metallic annular members.

In testimony whereof I hereunto affix my signature in the presence of two witnesses.

ALMOND H. GARRISON.

Witnesses:
T. M. STEWART,
C. A. GARRISON.